(12) United States Patent
Talin et al.

(10) Patent No.: US 6,755,241 B2
(45) Date of Patent: Jun. 29, 2004

(54) RADIATOR FOR A CENTRALIZED HEATING SYSTEM

(75) Inventors: Mario Talin, Fontaniva (IT); Francesco Dori, London (GB)

(73) Assignee: Talin S.r.l., Fontaniva (IT)

( * ) Notice: Subject to any disclaimer, the term of this patent is extended or adjusted under 35 U.S.C. 154(b) by 0 days.

(21) Appl. No.: 10/120,011

(22) Filed: Apr. 10, 2002

(65) Prior Publication Data

US 2002/0162653 A1 Nov. 7, 2002

(30) Foreign Application Priority Data

Apr. 12, 2001 (IT) ........................ VI2001A0081

(51) Int. Cl.[7] .............................. F28F 9/00; F28F 7/00; F24H 9/06
(52) U.S. Cl. .............................. 165/67; 165/49; 165/76
(58) Field of Search .................. 165/76, 67, 172, 165/173, 81, 49, 69; 403/7, 260; 126/101

(56) References Cited

U.S. PATENT DOCUMENTS

| 635,534 | A | * | 10/1899 | Florin | 285/197 |
|---|---|---|---|---|---|
| 1,797,524 | A | * | 3/1931 | Dwyer | 165/76 |
| 2,790,652 | A | * | 4/1957 | Risley et al. | 285/47 |
| 3,750,744 | A | * | 8/1973 | Bouras | 165/76 |
| 4,046,136 | A | * | 9/1977 | Izumi et al. | 126/665 |
| 4,223,205 | A | * | 9/1980 | Sturgis | 392/358 |
| 4,418,746 | A | * | 12/1983 | Langenhorst et al. | 165/78 |
| 4,531,575 | A | * | 7/1985 | Webster | 165/78 |
| 5,060,601 | A | * | 10/1991 | Viladenq | 122/406.1 |

FOREIGN PATENT DOCUMENTS

GB 366481 * 1/1932 ................ 165/81

* cited by examiner

Primary Examiner—Henry Bennett
Assistant Examiner—Tho V Duong
(74) Attorney, Agent, or Firm—Bucknam and Archer

(57) ABSTRACT

A radiator for a centralized heating system includes a plurality of tubular elements (1) and (2), reciprocally connected. The radiator is inserted in a hydraulic circuit in which flows a liquid heated by a boiler and circulated in a natural or forced manner. The liquid gives heat to the exterior through the lateral surfaces of the tubular elements. The tubular elements (1) and (2) are fixed one to the other by screw elements (3) which are provided with hydraulic sealing means whereby the discharge of the liquid from the tubular elements is prevented.

3 Claims, 7 Drawing Sheets

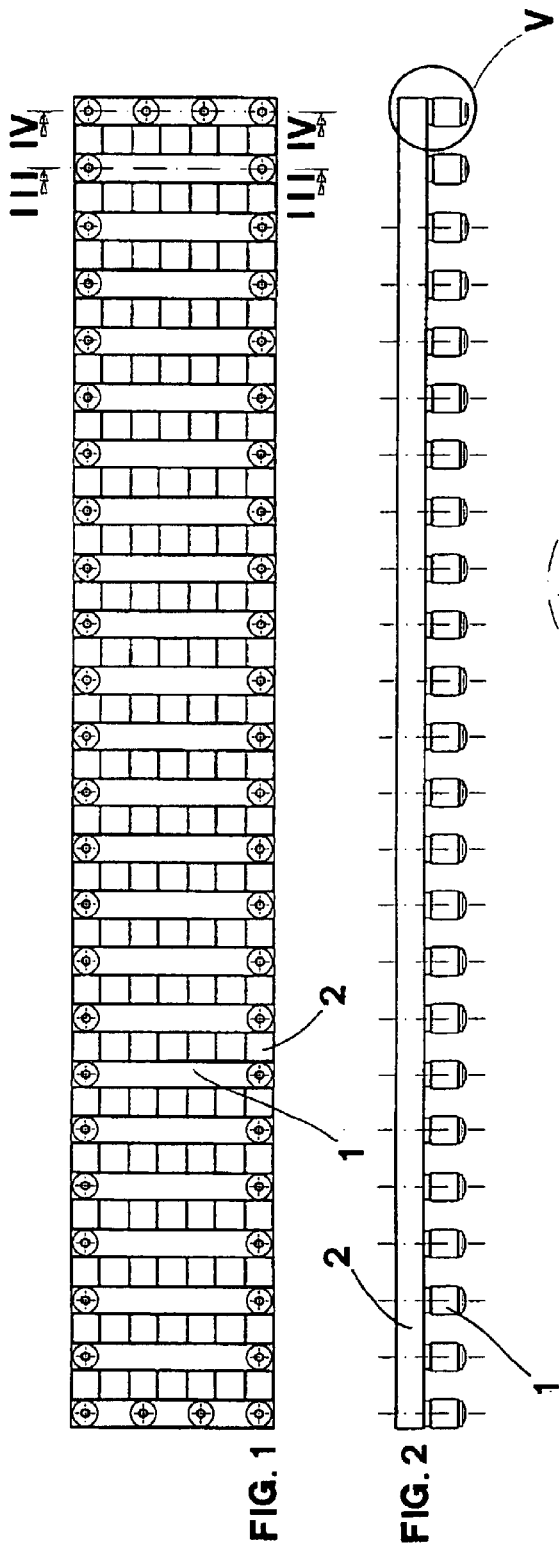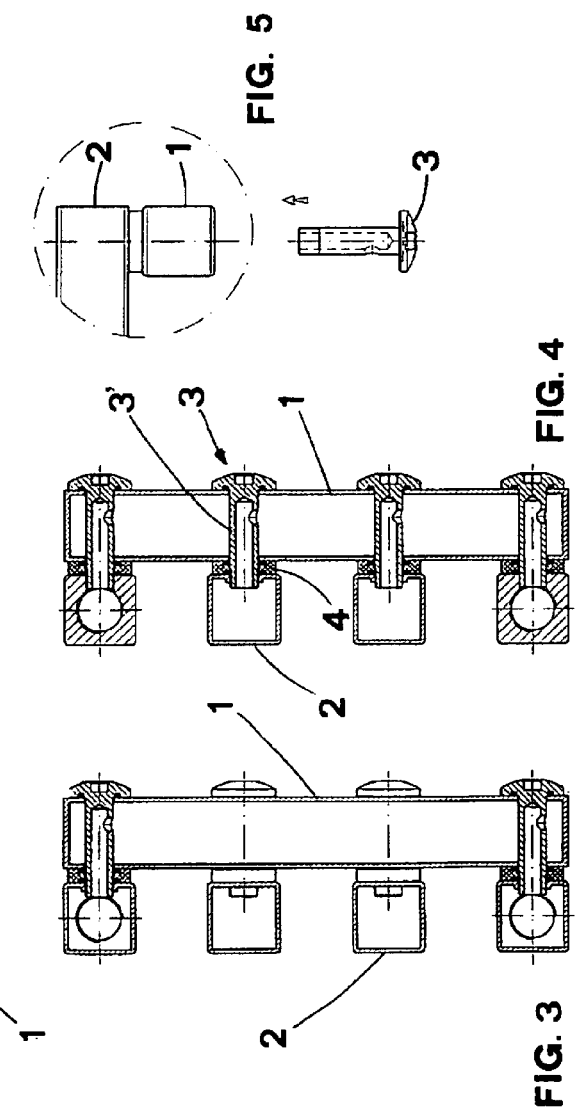

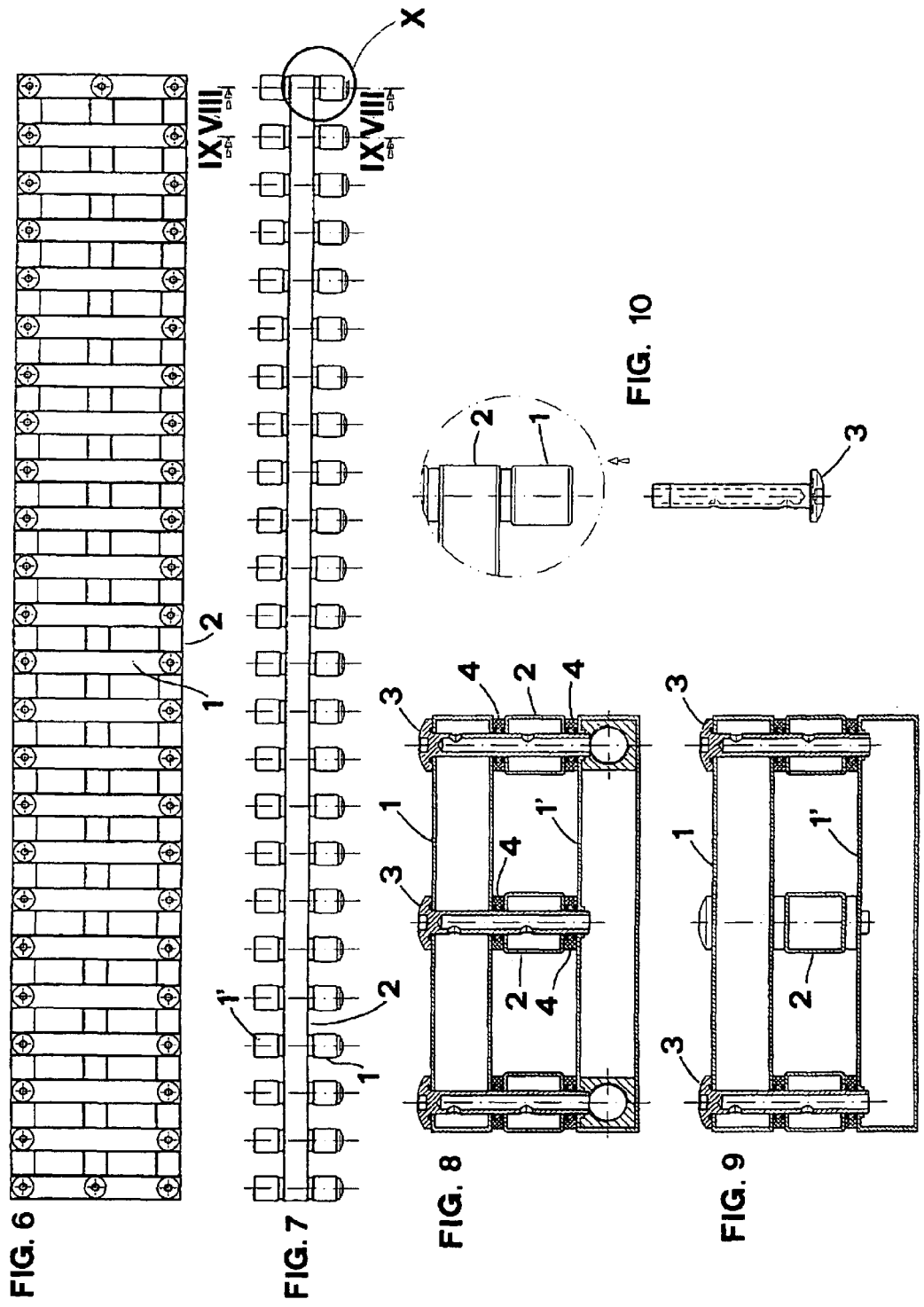

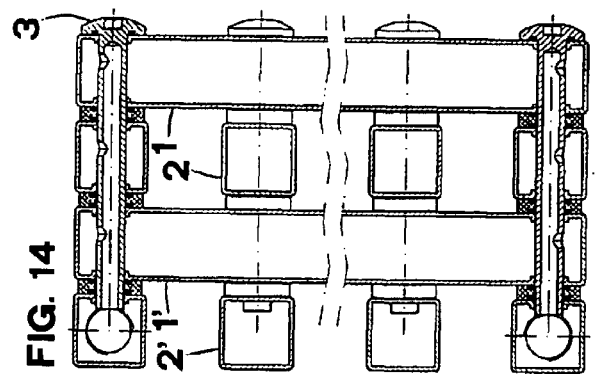
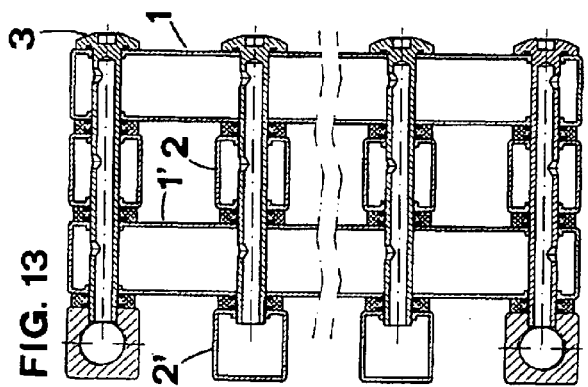
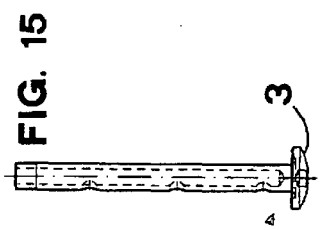
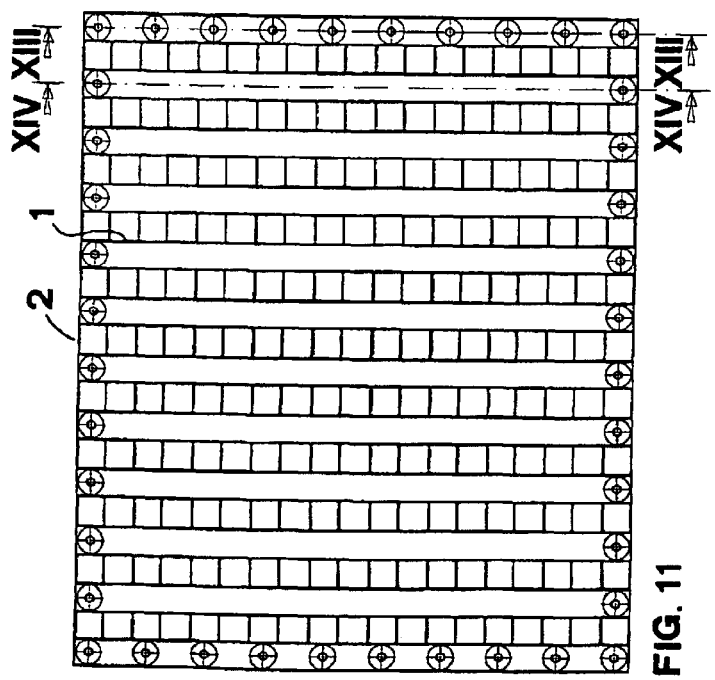
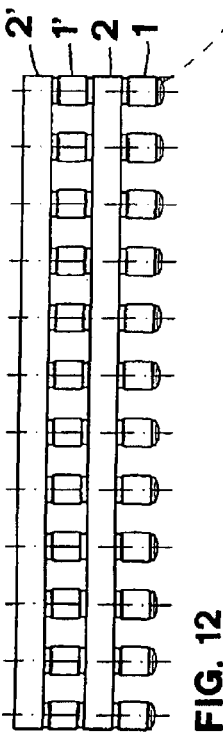

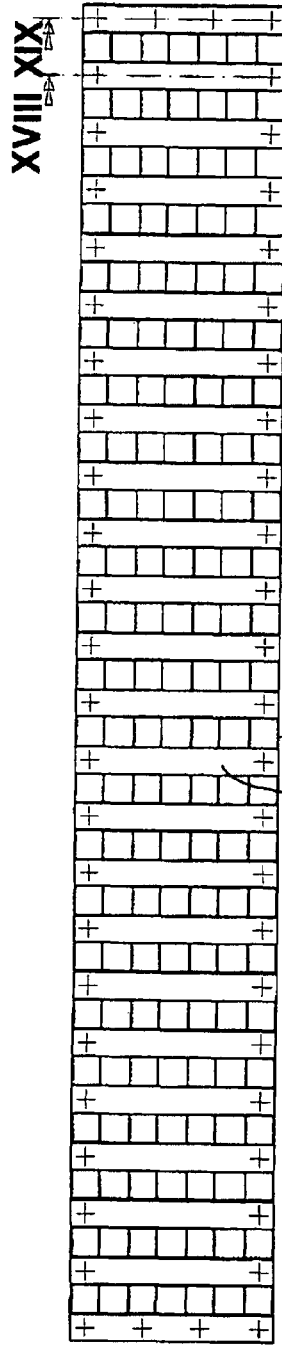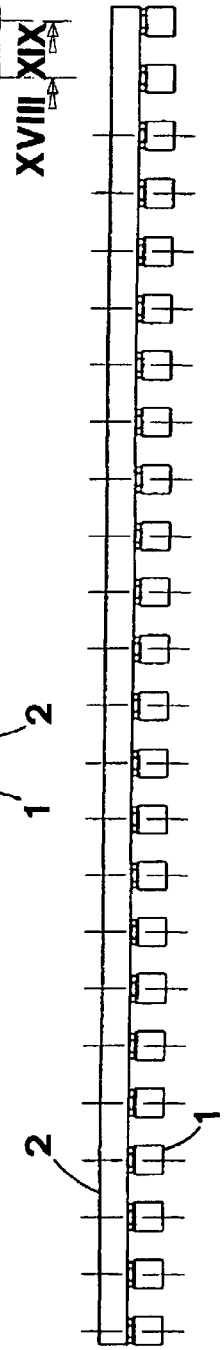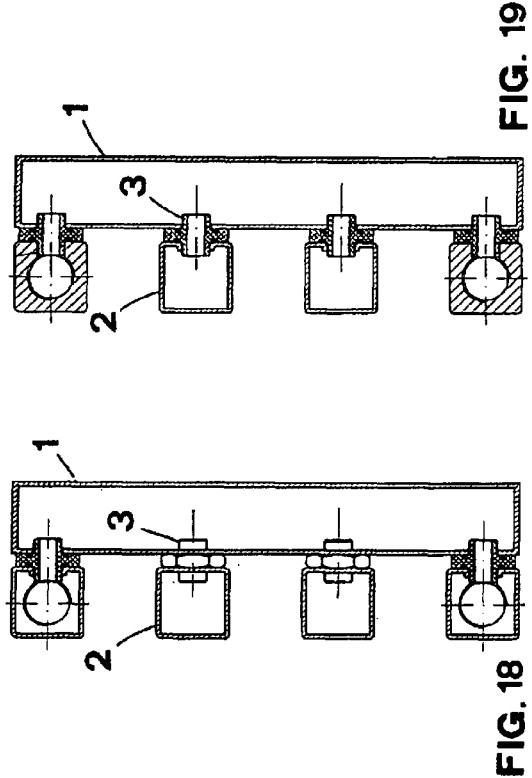
FIG. 16
FIG. 17
FIG. 19
FIG. 18

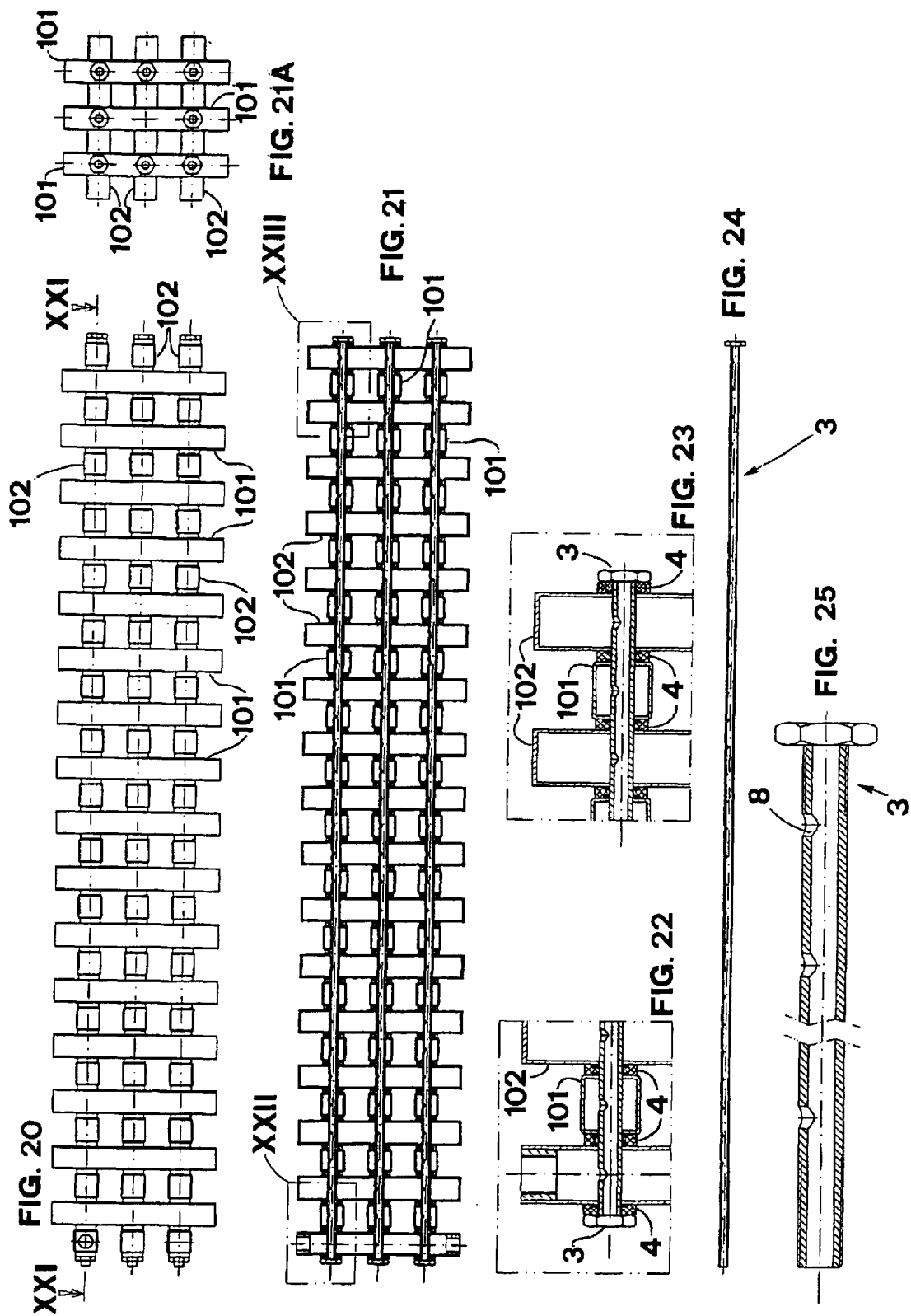

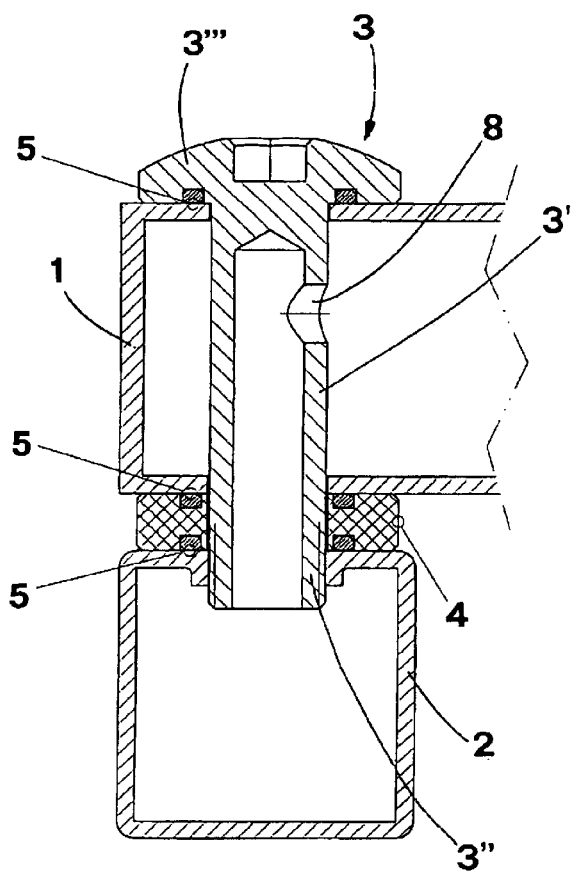
FIG. 26
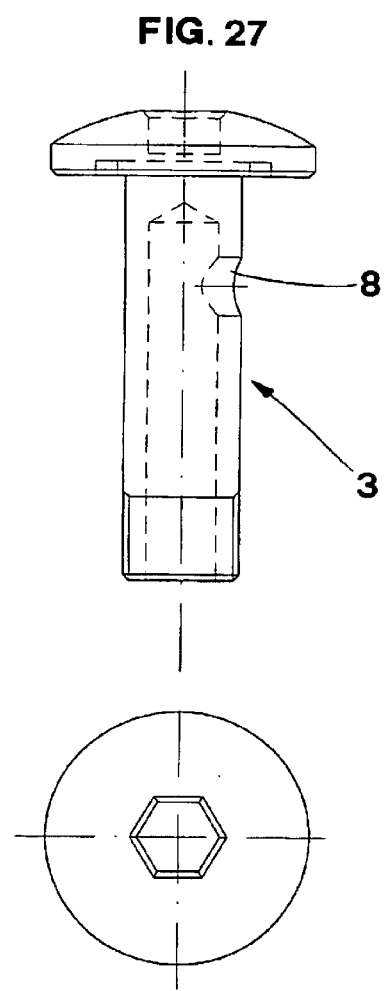
FIG. 27
FIG. 28

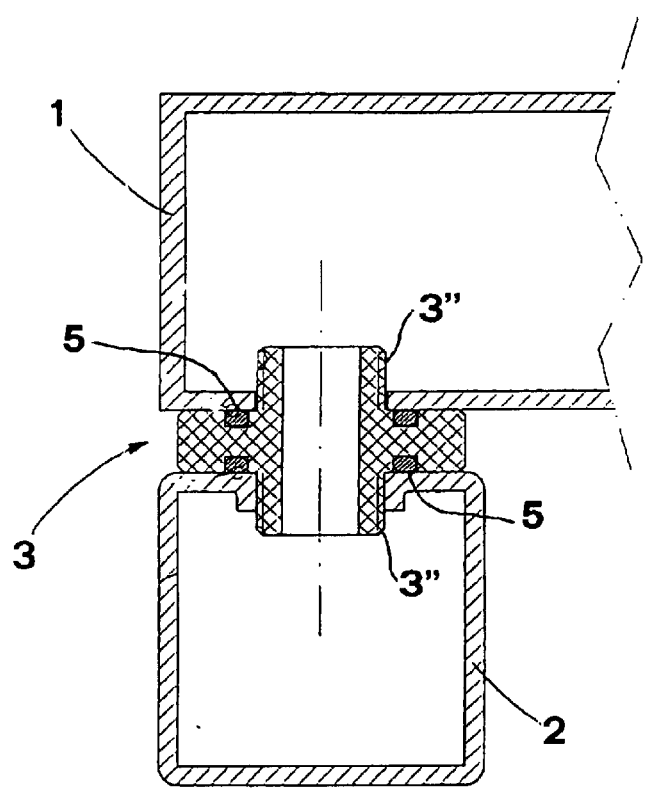
FIG. 29
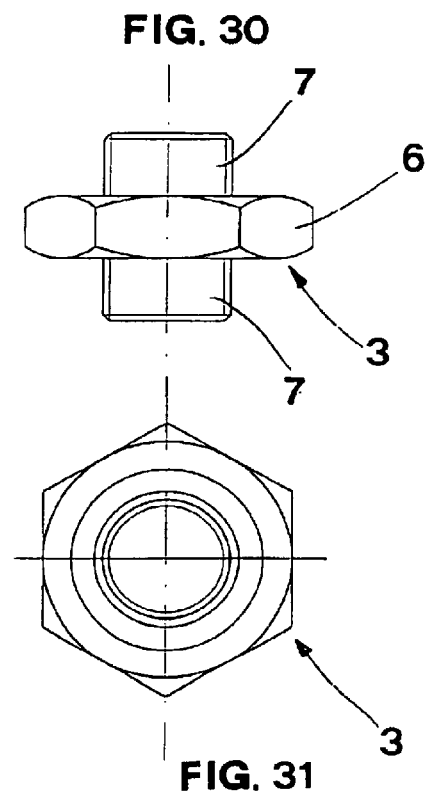
FIG. 30
FIG. 31

RADIATOR FOR A CENTRALIZED HEATING SYSTEM

FIELD OF THE INVENTION

This invention relates to a radiator for a centralized heating system.

DESCRIPTION OF THE PRIOR ART

It is known that the radiators of this type comprise a plurality of tubular elements which are connected one to the other and which are inserted in a hydraulic circuit in which a liquid flows. This liquid is heated by means of a boiler and is circulated naturally or in the greater part of the cases in a forced manner by means of a suitable circulation pump. This liquid warms the exterior by means of the lateral surface of the tubular elements. These elements are made separately one from the other and are fixed to each other by welding. The radiator is then painted or chromium plated due clearly to reasons of aesthetic point of view.

In every case, the fact that the elements which compose the radiator must be welded one to the other, causes definite limits to the possibility of making radiators of particular shape.

In actual practice, it would be desirable both from a functional and aesthetic point of view to make radiators in which the tubular elements are fixed one to the other without using weldings which are difficult to use and not aesthetic. However, this does not turn out to be simple or convenient so that manufacturers have for a long time put on the market radiators which substantially have the same shape apart from small constructive variations.

SUMMARY OF THE INVENTION

The object of the invention is to provide a radiator for central heating plant of the type described hereinabove but which is free of the drawbacks described and capable potentially of having any conformation.

This object is achieved according to the invention by providing tubular elements which are fixed together by means of screw elements equipped with means for hydraulic sealing. These elements are capable of avoiding the discharge of the liquid which is introduced in the radiator. These sealing elements are placed corresponding to the areas in which the screw elements enter into or emerge from the tubular elements of the radiator and prevent the discharge or leakage of the liquid. In this manner it is possible to achieve types of radiators which would be impossible to obtain or would be very hard to achieve by means of a union one to the other of the tubular elements by means of welding.

BRIEF DESCRIPTION OF THE DRAWINGS

These and other characteristics of the invention will be described in detail hereinbelow by reference to particular embodiments provided as non-limiting examples by reference to the accompanying drawings, of which:

FIG. 1 is a plan view of a first embodiment of the radiator of the present invention;

FIG. 2 is a side view of the radiator of FIG. 1;

FIG. 3 is a cross-sectional view taken along line III—III of FIG. 1;

FIG. 4 is a cross-sectional view taken along line IV—IV of FIG. 1;

FIG. 5 is an enlarged exploded view of detail V of FIG. 2;

FIG. 6 is a plan view of a second embodiment of the radiator of the present invention;

FIG. 7 is a side view of the radiator of FIG. 6;

FIG. 8 is a cross-sectional view taken along line VII—VII of FIG. 7;

FIG. 9 is a cross-sectional view taken along line IX—IX of FIG. 7;

FIG. 10 is an enlarged exploded view of detail X of FIG. 7;

FIG. 11 is a plan view of a third embodiment of the radiator of the present invention;

FIG. 12 is a side view of the radiator of FIG 11;

FIG. 13 is a cross-sectional view taken along line XIII—XIII of FIG. 11;

FIG. 14 is a cross-sectional view taken along line XIV—XIV of FIG. 11;

FIG. 15 is an enlarged side view of a screw element used in the third embodiment;

FIG. 16 is a plan view of a fourth embodiment of the radiator of the present invention;

FIG. 17 is a side view of the radiator of FIG. 16;

FIG. 18 is a cross-sectional view taken along line XVIII—XVIII of FIG. 16;

FIG. 19 is a cross-sectional view taken along line XIX—XIX of FIG. 16;

FIG. 20 is a plan view of a fifth embodiment of the radiator of the present invention;

FIG. 21 is a cross-sectional view of the radiator shown in FIG. 20 taken along line XXI—XXI of FIG. 20;

FIG. 21A is an end view of the radiator shown in FIG. 20;

FIG. 22 is an enlarged view of detail XXII of FIG. 21;

FIG. 23 is an enlarged view of detail XXIII of FIG. 21;

FIG. 24 is a cross-sectional view of the screw element used in the radiator of FIG. 20;

FIG. 25 is an enlarged view of a part of the screw element of FIG. 24;

FIG. 26 is a cross-sectional view of the interconnection of two tubular elements of the radiator of the present invention utilizing a first form of screw element;

FIG. 27 is a side elevational view of the screw element of FIG. 26;

FIG. 28 is a top plan view of the screw element of FIG. 27;

FIG. 29 is a cross sectional view of the interconnection of two tubular elements of the radiator shown in FIGS. 16–19 utilizing a second form of screw element;

FIG. 30 is a side elevational view of the screw element of FIG. 29;

FIG. 31 is a top plan view of the screw element of FIG. 30.

DETAILED DESCRIPTION OF THE INVENTION

FIGS. 1 and 2 show that the apparatus of the invention consists of a radiator for a centralized heating system which comprises two sets of tubular elements (1) and (2), within which flows a heated liquid coming from a boiler. These sets of tubular elements are disposed reciprocally in a perpendicular manner causing in practice the formation of a grating in which, however, the sides which constitute the links lie on different planes, even when they are parallel and brought close.

A fundamental characteristic of the apparatus of this invention is constituted by the fact that the reciprocal connection between the tubular elements (1) and (2) is ensured by the screw elements (3) (see FIGS. 26, 27, 28) which have stem (3'). This stem which has a threaded end 3" is inserted in the interior of tubular elements (1) and end 3" is inserted in a hole formed in the tubular element (2). The screw passes through washer (4), placed between the two tubular elements (1) and (2).

In both situations, first corresponding to the area of head (3''') of the screw element placed in contact with tubular element (1) and second corresponding to areas in which the washer (4) is placed in contact with the two tubular elements (1) and (2), there are present hydraulic sealing means preferably constituted by rings (5) of the "O ring" type, which obviously have the function of avoiding the discharge of fluid from the tubular elements.

FIGS. 29, 30 and 31 show that the screw element (3) may be constituted by a nut (6) which is provided with two extensions (7). These extensions have a cylindrical shape, are externally threaded (3") and engage in threaded cavities present in tubular elements (1) and (2). Two sets of tubular elements (1,2) are interconnected by these screw elements (3) as shown in FIGS. 16, 17, 18 and 19.

Returning to FIG. 26, it will be noted that the body (3') of screw element 3 is internally hollow and communicates with the exterior by means of hole 8. Analogously, screw element (3) shown in FIGS. 29, 30 and 31, is internally hollow and open at its ends.

All the features mentioned hereinabove allow an easy downflow of the heated fluid from one tubular element to the other. In particular, FIGS. 20 to 25 show that it is possible to use screw elements which have a total length equal to the length of the entire radiator. In practice, this screw element is intended to go through all the tubular elements of the radiator, longitudinally or transversally. Naturally the screw will be provided with a plurality of reciprocally spaced openings (8), and will be internally hollow so as to allow free circulation of the fluid in the interior of the several elements which constitute the radiator. By studying the attached drawings it will be concluded that the apparatus of this invention allows to achieve a very great variety of constructive shapes of radiators for heating. In particular it is possible to achieve structures with a practically indefinite number of levels of tubular elements, see for instance FIGS. 11 and 12.

Likewise it is possible to achieve very complex structures as the structures of FIGS. 20 and 21 which would be particularly difficult or absolutely impossible to fabricate with the techniques of known type.

Thus, there is shown in FIGS. 6 to 10 three sets of tubular elements (1, 2, 1') interconnected by screw elements (3). In FIGS. 11 to 15 four sets of tubular elements (1, 2, 1', 2') are interconnected by screw elements (3). In FIGS. 20, 21 and 21A there are shown three parallel rows of tubular elements (101) interspersed between three parallel rows of tubular elements (102) and interconnected as shown in FIGS. 22 and 23 by screw element (3) shown in FIGS. 24 and 25.

What is claimed is:

1. A radiator for a centralized heating system, wherein heated liquid is passed through the radiator, said radiator comprising:

a plurality of first tubular elements (1) disposed in a first plane;

a plurality of second tubular elements (2) disposed in a second plane parallel to said first plane, said second tubular elements being arranged adjacent to said first tubular elements;

screw elements (3) fixedly connecting said adjacent first and second tubular elements together by passing through openings provided therefore in said adjacent first and second tubular elements, said screw elements having an internal passageway therein communicating between the interiors of the interconnected first and second tubular elements; and hydraulic sealing means (5) in combination with said screw elements adapted to seal the openings in said first and second tubular elements provided for said screw elements so as to prevent leakage therefrom.

2. The radiator according to claim 1, wherein said screw elements (3) comprises a head (3''') and a stem (3'), said stem passing through at least one of said first and second tubular elements and into the interior of an adjacent tubular element and fixed therein.

3. The radiator according to claim 2, wherein said hydraulic sealing means comprises a washer having a hole therein through which the stem of said screw element passes.

* * * * *